United States Patent
Kulkaski

[11] Patent Number: 5,862,591
[45] Date of Patent: Jan. 26, 1999

[54] METHOD FOR MANUFACTURING PAINT ROLLERS

[76] Inventor: Stanley V. Kulkaski, 24 Stony Brook Dr., Warren, N.J. 07059

[21] Appl. No.: 636,547

[22] Filed: Apr. 25, 1996

[51] Int. Cl.⁶ .................................................. B23P 15/00
[52] U.S. Cl. ........................................ 29/895.211; 29/895.2
[58] Field of Search ............................... 29/895.21, 895, 29/527.2, 895.2; 156/187–189; 15/230.11

[56] References Cited

U.S. PATENT DOCUMENTS

| | | | |
|---|---|---|---|
| 1,152,110 | 8/1915 | Lockwood | 29/895.211 |
| 1,660,538 | 2/1928 | Whitney | 29/895.211 |
| 4,112,565 | 9/1978 | Sailas | 29/895.211 |
| 4,191,792 | 3/1980 | Janssen | 15/230.11 |
| 4,692,975 | 9/1987 | Gracia | 156/187 |
| 5,195,242 | 3/1993 | Sekar | 29/895.21 |
| 5,206,968 | 5/1993 | Bower et al. | 15/230.11 |
| 5,273,604 | 12/1993 | Garcia | 156/187 |
| 5,572,790 | 11/1996 | Sekar | 29/895.211 |

Primary Examiner—Irene Cuda
Attorney, Agent, or Firm—Robert M. Skolnik

[57] ABSTRACT

Paint rollers are formed in a continuous process. A plastic material is delivered from pellets or powder to an extruder and then, directly from the extruder to an internally cooled mandrel. The heat of the extrusion process provides the sealing temperature between the fabric cover and the plastic strip. No additional heat source is required to soften the surface of the core. The method incorporates single extrusion or tandem or co-extrusion techniques in fabricating paint rollers where an additional layer of tacky plastic material is bonded to the surface of a base layer of plastic material to enable the fabric cover to adhere to the roller.

18 Claims, 4 Drawing Sheets

METHOD FOR MANUFACTURING PAINT ROLLERS

FIELD OF THE INVENTION

This invention relates to a method for the efficient and cost effective manufacture of paint rollers.

DESCRIPTION OF THE PRIOR ART

Several prior patents disclose paint rollers and methods for making same. These include Garcia U.S. Pat. No. 4,692,975 and the prior art cited therein, namely, Janssen, U.S. Pat. No. 4,191,792, European Patent 69335 and German 2303230. Other patents include U.S. Pat. No. 2,895,511 to Seltman and U.S. Pat. No. 2,943,540 to McBain.

These patents generally deal with various aspects of the two known methods of manufacturing paint rollers. In the first method, a fabric strip is bonded to a tubular plastic or cardboard core using an adhesive. In this method, a tubular plastic or cardboard core is inserted lengthwise over a rotating cylinder or spindle, the fabric cover in the form of strip is wound over the core in a helical manner. An adhesive is used to adhere the fabric strip to the core.

The second method requires bonding the fabric strip to the tubular core without the use of adhesive. In this method, a heat source is used to soften the surface of the plastic core.

The fabric is wound helically in a spiral over the core. The fabric cover and the plastic core are forged together to form an integral body, by applying heat to the core. The heat source is located parallel to the plastic core in the point where the fabric is fed over the core.

The first method requires special adhesives to produce the required bond between fabric and core. Special adhesive handing equipment is also required to be purchased from the adhesive supplier. The core is either purchased or fabricated from a series of plastic strips and paper or phenolic impregnated strips.

The second method requires a heat source to soften the core. The core is either purchased or manufactured from a series of plastic strips.

The manufacture of paint rollers by either of the prior art methods are characterized by multiple steps involving the fabrication of the plastic tubular core or strip, then the subsequent addition of adhesive or heat from a heat source to bond the fabric to the tubular core or strip.

SUMMARY OF THE INVENTION

The present invention provides a process of forming paint rollers in a single step. A plastic material is delivered from pellets or powder to an extruder and then, directly from the extruder to an internally cooled mandrel. The heat of the extrusion process provides the sealing temperature between the fabric cover and the plastic strip. No additional heat source is required to soften the surface of the core as is the prior art.

The present invention incorporates single extrusion, tandem extrusion or co-extrusion techniques in fabricating paint rollers. In one embodiment of the method of my invention employing single extrusion, a continuous plastic strip from an extruder is spirally wound on an internally cooled mandrel. The heat of the extruder is sufficient to seal the edges to form a tube as well as to provide a tacky surface on which to place the fabric cover. Once the fabric cover is placed on the core, the cover and the core are engaged by a belt with sufficient pressure to produce a paint roller in continuous length.

In another embodiment of the method of my invention employing co-extrusion, the plastic strip is extruded and is laid on a mandrel in spiral pitch. The plastic strip wraps around the mandrel and forms a tube by moving along the mandrel. The width and pitch of the strip are chosen to produce a core tube of tie desired inside diameter. A bonding strip is fused internally in the die of the extruder to the strip itself and the nature of the bonding material is such to produce the bond. The fabric cover is applied to the tacky surface co-extruded onto the core.

In a further embodiment of the method of my invention employing tandem extrusion, a hot plastic strip is laid on an internally cooled mandrel to produce a helically wound core. A second extruder is positioned down stream for extruding a bonding strip onto the core to produce a tacky surface on the exterior surface of the core. The paint roller fabric is then placed on the core. Tandem extrusion produces a bonding edge which is fused to the forming core so that the fabric cover and the plastic core can bond together.

The present invention provides a method for efficiently manufacturing paint rollers using plastic extrusion. The method of my invention involves the use of existing plastic extrusion techniques and equipment where the output hot thermo plastic sheet materials are further processed by winding directly onto a cooling mandrel. The invention applies the paint roller fabric covering to the wound sheet on the mandrel. Intermediate steps before application of the fabric covering may, alternatively be incorporated in the method to produce a tacky layer of a second material on the wound core.

A principal object of the invention is the provision of a method for manufacturing paint rollers in a single step which method is faster and more economical that the processes of the prior art. A still further object and advantage of the present invention is the provision of a method of manufacturing paint rollers using known and existing sheet extrusion techniques and equipment. A still further object and advantage of the present invention is the provision of a method for paint roller production which makes the roller in one operation. Another object and advantage of the present invention is tile provision of a method for making paint rollers which relies solely on the hot output of plastic sheet from the extrusion for subsequent operations. Another object and advantage of the present invention is the provision of a method of paint roller fabrication where a layer of material having a hot tackiness than the core material is extruded onto the core to increase the ability of the paint roller fabric to adhere to the core.

A still further object and advantage of this invention is the provision of a method of manufacturing paint rollers which does not require adhesives. Another object and advantage of the present invention is the provision of a method for producing paint rollers which limits use of manual labor.

BRIEF DESCRIPTION OF THE DRAWINGS

These as well as further objects and advantages of the invention will become apparent to those skilled in the art from a review of the following detailed specification of my invention reference being made to the accompanying drawings in which:

FIG. 2A is a cross sectional view of a portion of the die 11 of FIG. 2;

FIG. 2B is a cross sectional view of the output of die 11 of FIG. 2;

DETAILED DESCRIPTION OF THE INVENTION

Figure 1:
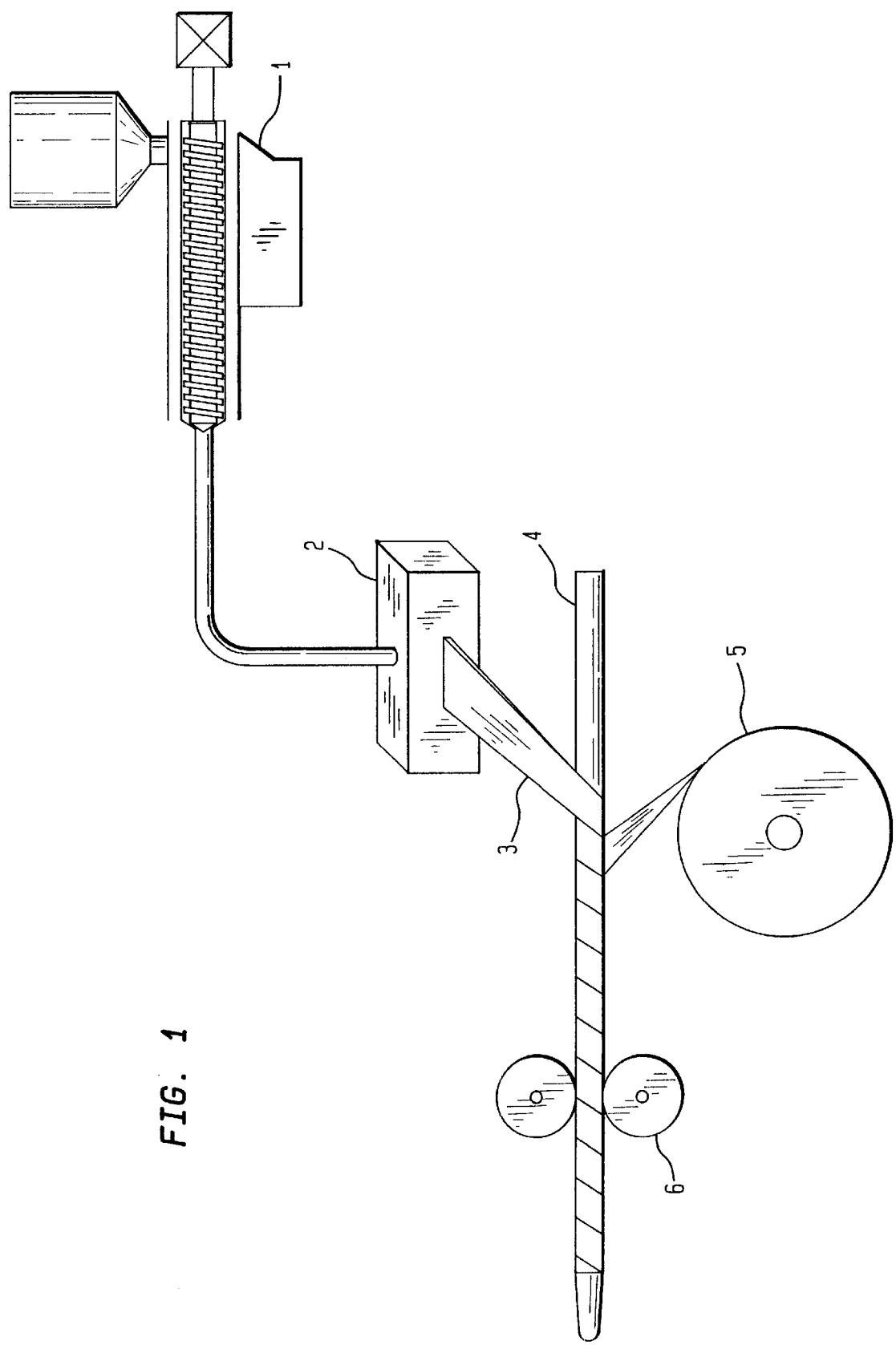
FIG. 1 is a diagrammatic view of a single extrusion paint roller production line.

FIG. 1 is a diagrammatic view of single extrusion paint roller production line according to my invention. A continuous plastic strip 3 from an extruder 1 and die 2 is spirally wound on an internally cooled mandrel 4. The heat of the extruder 1 on strip 3 is sufficient to seal the edges of strip 3 to form a tube on mandrel 4 as well as to provide a tacky surface on which to place the fabric cover 5. Once the fabric cover 5 is placed on the core, the cover 5 and the core are engaged by a belt 6 with sufficient pressure to produce a paint roller of continuous length.

Figure 2:
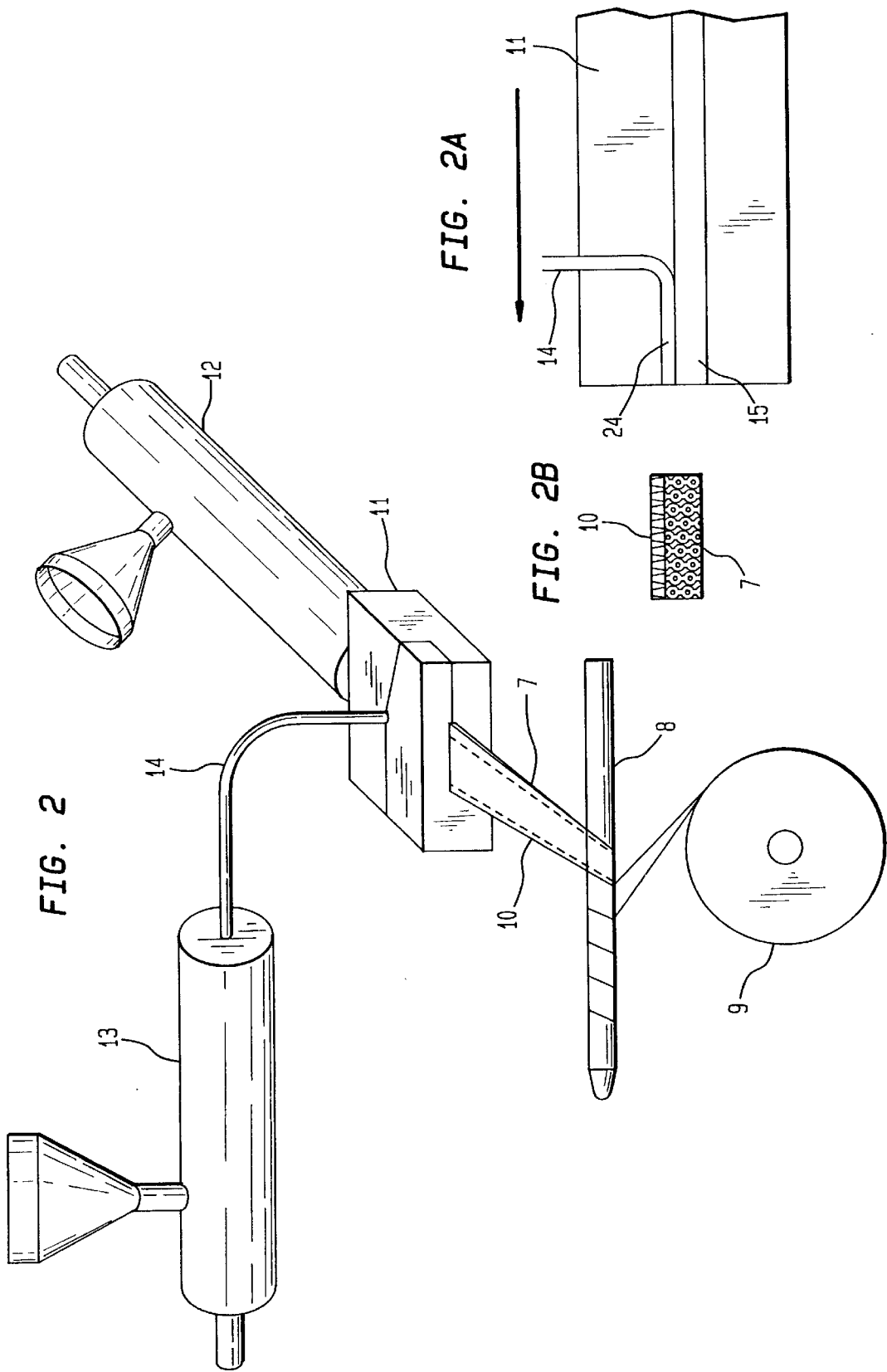
FIG. 2 is a diagrammatic view of a co-extrusion paint roller production line.

FIGS. 2 and 2A show another embodiment of the method of my invention employing co-extrusion. The plastic strip 7 is extruded from extruder 12 and die 11 and is laid on mandrel 8 in spiral pitch. The plastic strip 7 wraps around the mandrel 8 and forms a tube by moving along the mandrel 8. The width and pitch of the strip are chosen to produce a core tube of the desired inside diameter. A bonding strip 10, produced by another extruder 13 is fused onto the strip 7 internally in the die 11. The nature of tile bonding material from extruder 13 and the material of strip 7 in extruder 12 are chosen to produce the bond. The fabric cover 9 is applied to the tacky surface 11 co-extruded onto the core. Extruder 13 is connected to die 11 via output connector 14.

Die 11 is illustrated in FIG. 2A in cross section. More particularly, die 11 is a two section die which received the output of extruder 13 via connector 14 and extruder 12 in chamber 15. The connector 14 is connected to another separate die chamber 24. The outputs of chambers 15 and 24 produce the two layer strip of FIG. 2B.

Figure 3:
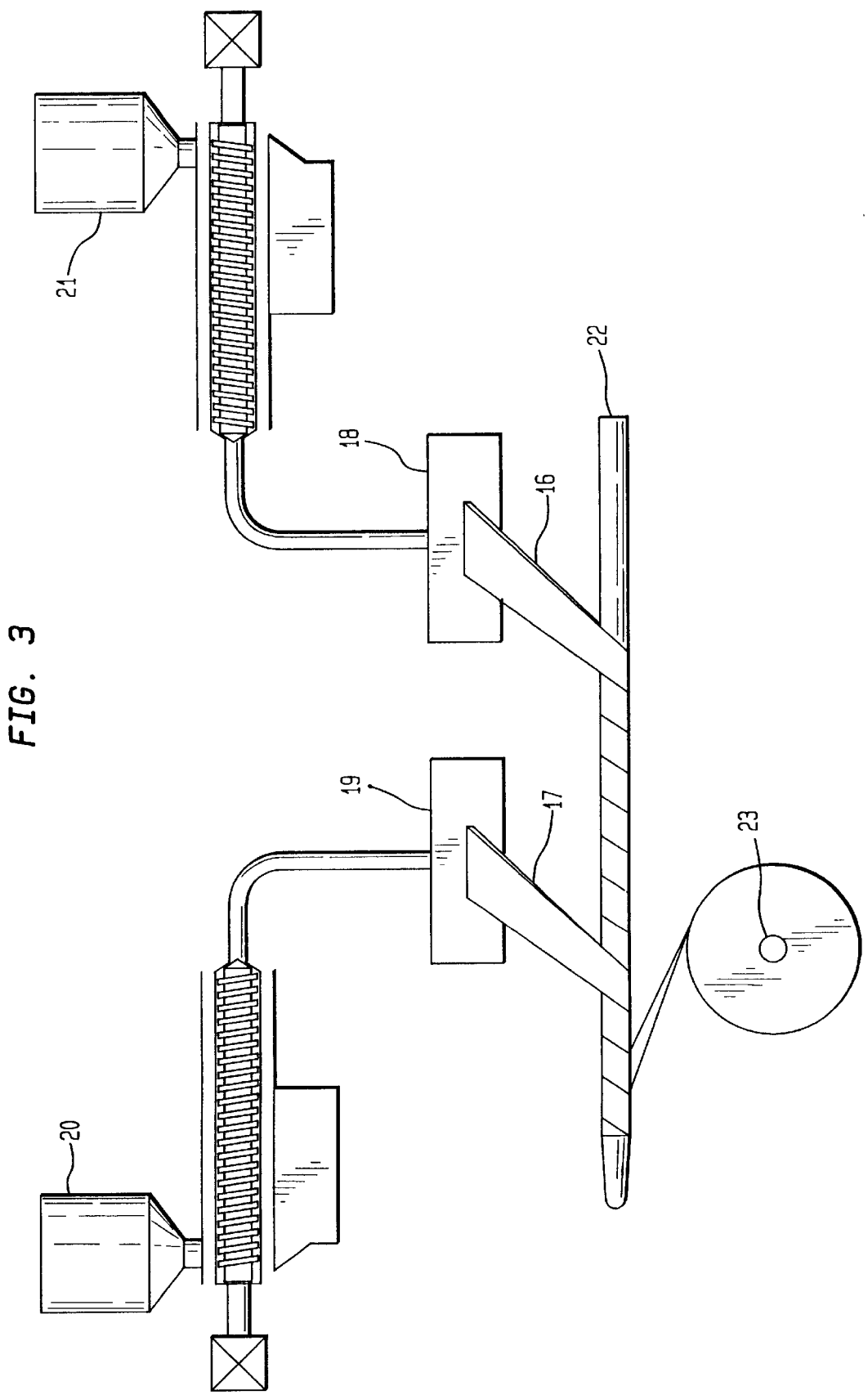
FIG. 3 is a diagrammatic view of a tandem extrusion paint roller production line.

Another embodiment of the method of my invention employing tandem extrusion is illustrated in FIG. 3. A hot plastic strip 16, formed by extruder 21 and die 18, is laid on an internally cooled mandrel 22 to produce a helically would core. A second extruder 20 is positioned down stream for extruding a bonding strip 17 in die 19 onto the core to produce a tacky surface on the exterior surface of the core. The paint roller fabric 23 is then placed on the core. Tandem extrusion produces a bonding edge which is fused to the forming core so that the fabric cover and the plastic core can bond together.

Figure 4:
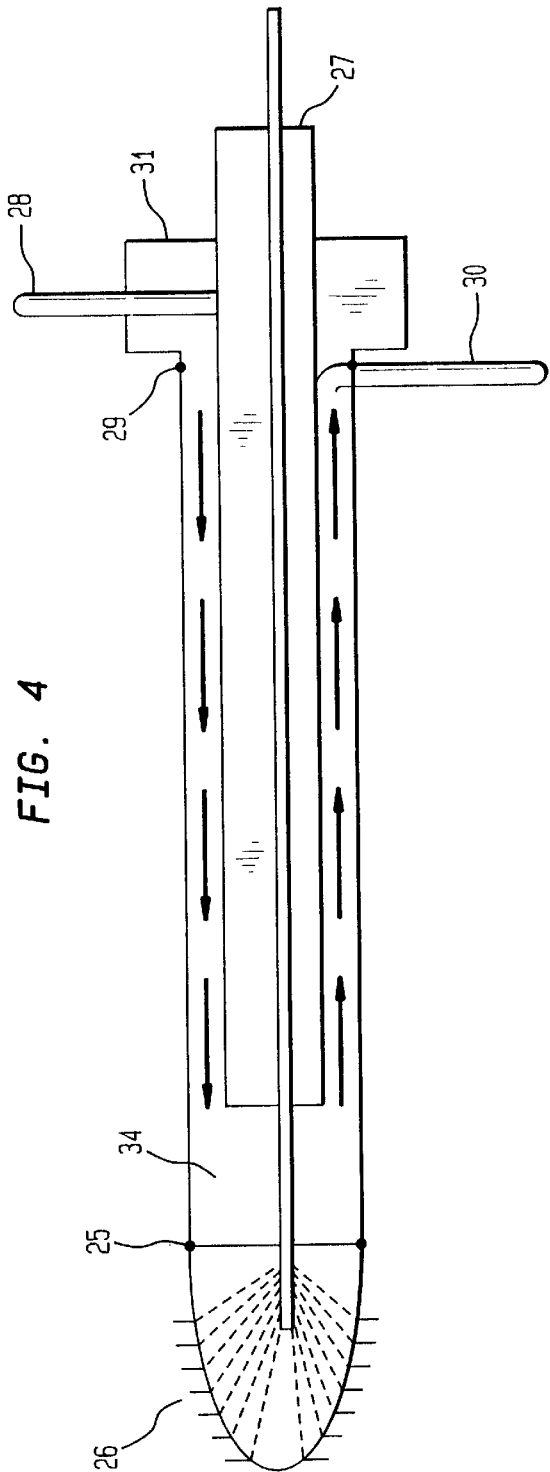
FIG. 4 is a side diagrammatic view of the mandrel used in the processes of FIGS. 1–3.
Figure 5:
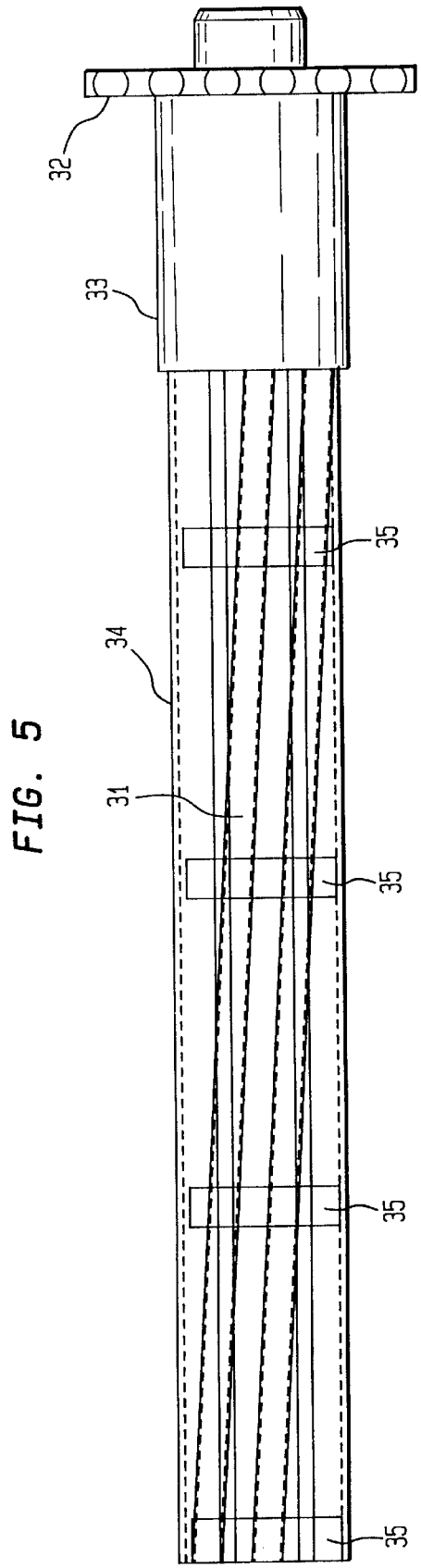
FIG. 5 is a diagrammatic side view of the mandrel of FIG. 4.

The mandrels 4, 8 and 22 of FIGS. 1, 2 and 3 may be of the type illustrated in FIGS. 4–5. In FIG. 4, a mandrel 34 has air and water cooling channels formed therein. The water cooling is fed from input 28 to chamber 31 and exits at output 30. Air is supplied to pipe 27 and exists at apertures 26 at the end of the mandrel. O-ring seals 25 and 29 are provided to prevent leakage of the water coolant.

FIG. 5 shows mandrel 34 having rotating springs 31 mounted thereon. Springs 31 are attached to spring supports 35. The springs 31 are affixed to the motor driven rotator 32 and 33. As will now be seen, rotation of the rotator 32, 33 causes springs 31 to rotate. The springs are attached to the outputs of dies 2, 11, and 18 of FIGS. 1, 2 and 3 and draw the plastic strip output of the dies onto the mandrel.

Each of the embodiments of my invention are further illustrated by the following examples. The method described in FIG. 1 employed the following apparatus: extruder 1, model 3"-24/1 single screw, manufactured by Akron; die 2, manufactured by Somerset Machine; mandrel 4, a water cooled mandrel as described herein, manufactured by Somerset Machine; fabric 5 manufactured by Cecyl Mills and pressure belt 6 model manufactured by Paco Manufacturing. Material 3 is olefin available from Union Carbide.

The above apparatus employing 200 lbs of material 3 extruded 2400 feet of strip 3 onto mandrel 4. The temperature of the output strip 3 was between 320° F. and 450° F. The distance between the points of intersection of the strip 3 on mandrel 4 and the location of the point of intersection of fabric 5 was five inches. The pressure applied by belt 6 was 15 psi.

The method described in FIGS. 2, 2A and 4 employed the following apparatus: extruder 12, model 3", manufactured by Akron; extruder 13, model 2½", manufactured by Prodex; die 11, described herein, manufactured by Somerset Machine; mandrel 8, a water cooled mandrel as described herein, manufactured by Somerset Machine, and fabric 9, manufactured by Cecyl Mills. Material 7 is Olefin, available from Union Carbide. Material 10 is ENGAGE® available from Dow Plastics prepared as described herein.

The above apparatus employing 200 lbs of material 7 and 50 lbs of material 10 extruded 2400 feet of strip onto mandrel 8. The temperature of the output strip 7 was between 320° F. and 420° F. The temperature of the output strip 10 was between 320° F. and 420° F. The distance between the points of intersection of the strip 7 oil mandrel 8 and the location of the point of intersection of fabric 9 was 18 inches.

The method described in FIG. 3 employed the following apparatus: extruders 20 and 21, models 2½" and 3", respectively, manufactured by Prodex and Akron, respectively; dies 18 and 19, manufactured by Somerset Machine; mandrel 22, a water cooled mandrel manufactured by Somerset Machine; and fabric 23, manufactured by Cecyl Mills. Material 16 is olefin available from Union Carbide. Material 17 is ENGAGE® available from Dow Plastics prepared as described herein.

The above apparatus employing 200 lbs of material 16 and 50 lbs of material 17 extruded 2400 feet of strip onto mandrel 22. The temperature of the output strip 16 was between 300° F. and 450° F. The temperature of the output strip 17 was between 300° F. and 420° F. The distance between the points of intersection of the strip 17 on mandrel 22 and the location of the point of intersection of fabric 23 was twenty-three inches.

I have found that the bonding between materials 7, 10 (FIG. 1) and 16, 17 (FIG. 2) is enhanced if material (7, 17) is a saturated ethylene-octane copolymer sold by Dow Plastics under the trademark ENGAGE® blended with a percentage of A-C ethylene-carbon monoxide copolymer to enhance the bonding between the thermoplastic core material and the fabric used on paint roller cores. The percentage of A-C ethylene carbon monoxide copolymer may vary depending on the degree of peel strength desired. An example of the preparation of the bonding material is used in the example contained a mix of ENGAGE® and 5% A-C. I believe that levels of 5% or greater of A-C will yield the desired results.

ENGAGE® is a product of the metallocene catalyst technology of Dow Plastics, Metallocene catalysts offer much greater control of molecular weight distribution than other types of catalysts. The metallocene catalyst is a unique constrained geometry catalyst and process technology. By using metallocene catalysts Dow Plastics is able to insert a high degree of long chain branching into an olefin-based polymer. ENGAGE® is an ethylene-octane copolymer produced via metallocene catalyst technology. ENGAGE® offers improved resistance, excellent mechanical properties, superior heat stability and optimum balance between performance and proccessability.

As will be apparent to those skilled in the art, the method of the present invention simplifies the complexities associated with paint roller fabrication. Further modifications to the methods and apparatus of the invention may be made without departing from the spirit and scope of the invention; accordingly, what is sought to be protected is set forth in the appended claims.

I claim:

1. The method of making paint rollers comprising the steps of: forming plastic in a continuous flat hot strip; laying said strip on rotating springs surrounding a stationary mandrel; applying fibrous material onto said hot strip on said rotating springs; and cooling said stationary mandrel interiorly along substantially the entire length of said stationary mandrel.

2. The method of claim 1 wherein said plastic is formed by extrusion.

3. The method of claim 1 further including the step of applying pressure to said fibrous material to enhance the adherence of said fibrous material to said hot strip.

4. The method of making paint rollers comprising the steps of: forming plastic in a continuous flat hot strip; laying said strip on rotating springs surrounding a stationary mandrel; and applying fibrous material onto said hot strip on said rotating springs; forming plastic of a second material; and bonding said second material to said strip for creating a tacky surface on said strip for bonding said fibrous material to said strip.

5. The method of claim 4 wherein said second material is formed by extrusion.

6. The method of claim 5 wherein said strip and said second material are combined in a die and then applied to said rotating springs.

7. The method of claim 5 wherein said strip is applied to said rotating springs from a first die and said second material is then applied to said strip on said rotating springs from a second die.

8. A method of continuously manufacturing paint rollers comprising the steps of: extruding a hot plastic strip onto a mandrel, rotating a portion of said mandrel to cause said strip to form an elongated core; while said elongated core is still hot, applying a fibrous material to said elongated core, the temperature of said elongated core being sufficient to cause said fibrous material to adhere to said elongated core; and cooling said mandrel interiorly along substantially the entire length of said mandrel.

9. The method of claim 8 further including the step of extruding onto said hot plastic elongated core, a second hot plastic strip of a different material than said hot plastic strip, before applying said fibrous material.

10. A method of continuously manufacturing paint rollers comprising the steps of: extruding a hot plastic strip onto a mandrel, rotating a portion of said mandrel to cause said strip to form an elongated core; while said elongated core is still hot, applying a fibrous material to said elongated core, the temperature of said elongated core being sufficient to cause said fibrous material to adhere to said elongated core; extruding onto said hot plastic elongated core, a second hot plastic strip of a different material than said hot plastic strip, before applying said fibrous material said second hot plastic strip being extruded onto said hot plastic strip by co-extrusion.

11. A method of continuously manufacturing paint rollers comprising the steps of: extruding a hot plastic strip onto a mandrel, rotating a portion of said mandrel to cause said strip to form an elongated core; while said elongated core is still hot, applying a fibrous material to said elongated core, the temperature of said elongated core being sufficient to cause said fibrous material to adhere to said elongated core; extruding onto said hot plastic elongated core, a second hot plastic strip of a different material than said hot plastic strip, before applying said fibrous material said second hot plastic strip being extruded onto said hot plastic strip by tandem extrusion.

12. The method of claim 4 wherein said second material is a saturated ethylene-octane copolymer blended with a percentage of A-C ethylene-carbon monoxide copolymer.

13. The method of claim 12 wherein the percentage of A-C ethylene-octane carbon monoxide copolymer is at least 5%, by weight.

14. The method of claim 9 wherein said different material is a saturated ethylene-octane copolymer blended with a percentage of A-C ethylene-carbon monoxide copolymer.

15. The method of claim 14 wherein the percentage of A-C ethylene-octane carbon monoxide copolymer is between at least 5%, by weight.

16. The method of claim 4 wherein said second material includes a material formed by use of metallocene catalysts.

17. The method of claim 9 wherein said different material includes a material formed by use of metallocene catalysts.

18. The method of claim 1 wherein said cooling includes the steps of applying a cooling liquid interiorly of a first portion of said stationary mandrel; and applying a cooling gas interiorly of a second portion of said stationary mandrel.

* * * * *